May 22, 1956   D. M. BEARD ET AL   2,746,369
SHOULDER CAMERA MOUNT

Filed Sept. 21, 1953   2 Sheets-Sheet 1

INVENTORS
DONALD M. BEARD
PETER P. BRUCE
KURT KRIEGSMANN

BY
*G. D. O'Brien*
*R. M. Hicks*
ATTORNEYS

INVENTORS
DONALD M. BEARD
PETER P. BRUCE
KURT KRIEGSMANN

BY

ATTORNEYS

United States Patent Office 2,746,369
Patented May 22, 1956

2,746,369
SHOULDER CAMERA MOUNT

Donald M. Beard, Spencerville, Md., Peter P. Bruce, Tyrone, Pa., and Kurt Kriegsmann, Washington, D. C.

Application September 21, 1953, Serial No. 381,524

9 Claims. (Cl. 95—86)

(Granted under Title 35, U. S. Code (1952), sec. 266)

The invention described herein may be manufactured and used by or for the Government of the United States of America for governmental purposes without the payment of any royalties thereon or therefor.

This invention relates to a camera gun mount and more particularly to a shoulder supporting, hand held apparatus for use with cine type or other relatively heavy cameras when used with long focus or telephoto type lenses.

More specifically the invention proposes a mount for both the movie or cine film type camera and the telephoto lens attached thereto whereby the weight of the camera is supported substantially over the shoulder of the cameraman with a suitable frame and handles thereon for steadying the outer portion of the lens and for directing the line of sight of the camera through various angles of elevation and depression.

Prior camera guns of both the cine and single exposure varieties have incorporated gun stock configurations with clamping arrangements thereon for retention of the camera with lens whereby the camera and lens are supported by the operator's hands while the butt of the stock functions merely as a steadying means.

The other alternative to the gun stock arrangements lies in the use of a tripod. Neither the conventional gun stock nor the tripod type support are entirely satisfactory for high angles of elevation approaching and including the zenith condition and for following action or movement of an object moving at high speeds. The fatigue to the cameraman, as well as the lack of stability of the camera with extended periods of use both at higher angles of elevation and at slight angles of elevation are disadvantages which are substantially overcome with the instant shoulder mount.

The proposed mount is well adapted for, and advantageously permits of high frame speed or "slow motion" exposures of aircraft launched ordnance or of anti-aircraft type gun fire with long focus lenses and throughout the entire trajectory thereof. The use of the invention in such other phases of photography as sports and bird and wild life applications will be obvious.

It is a feature of this invention to provide a shoulder supported camera mount for use with heavy lens and camera assemblies and particularly with telephoto and long focus lenses.

One object of this invention resides in the provision of a camera gun, the weight of which is so distributed that the center of gravity thereof at elevated positions is substantially disposed to fall along a line through the shoulders and torso of the camera operator.

Another object resides in the provision of a camera mount which substantially overcomes operator fatigue as encountered with substantially hand held devices of the character heretofore or now in general use.

It is another object to provide a camera and lens mount and steadying device which provides a high order of maneuverability through high angles of elevation as well as angles of depression.

It is also an object to provide means by which adjustment may be provided for varying the reach of the forward support to accommodate operators of differing physical statute.

Another object resides in the provision of auxiliary finder arrangements carried by the mount by which the operator can continuously follow the movement of an object while maintaining simultaneous operation of the camera.

Other objects and many of the attendant advantages of this invention will be readily appreciated as the same becomes better understood by reference to the following detailed description when considered in connection with the accompanying drawings wherein.

Figure 1:
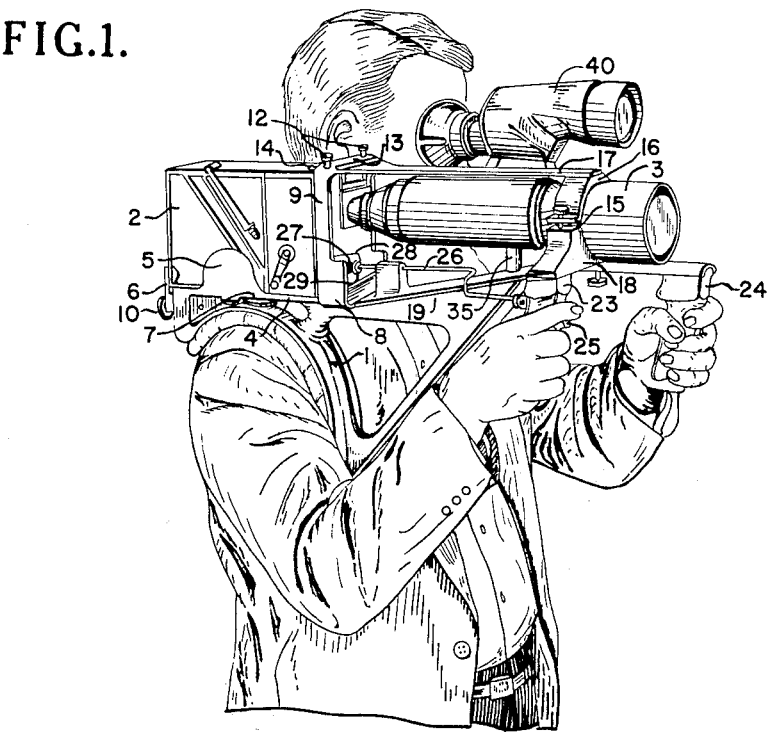
Fig. 1 is a pictorial illustration of the camera gun and lens mount of the instant invention from the right hand side thereof, as adapted for support and use from the operator's shoulder.
Figure 2:
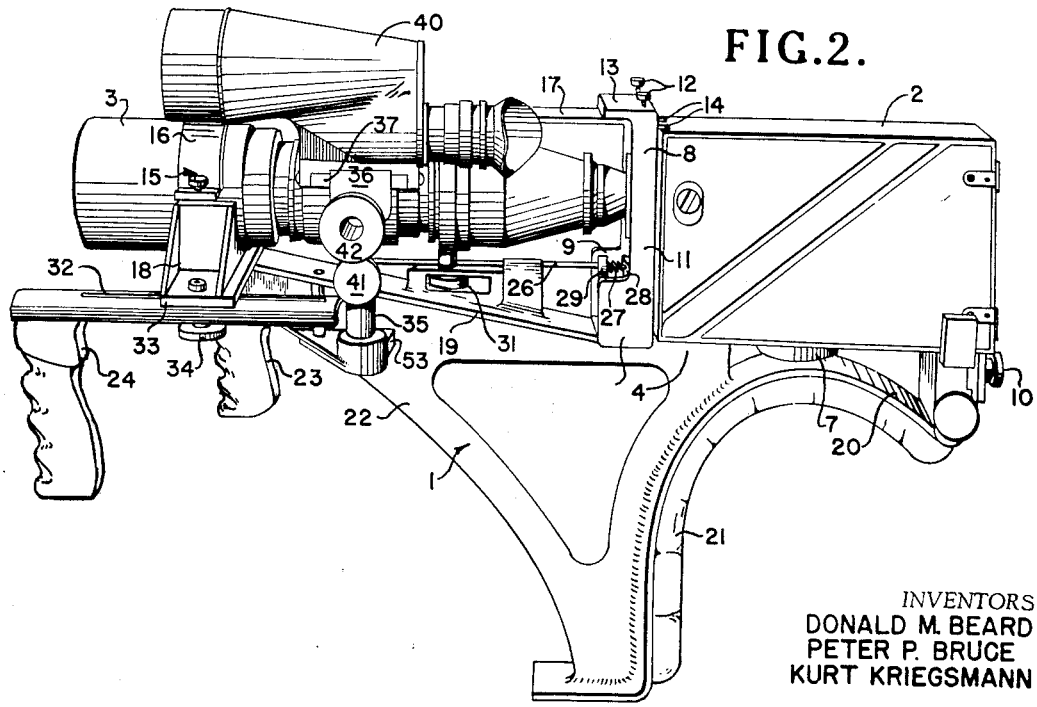
Fig. 2 is a pictorial view in elevation of the left hand side of the camera, lens and shoulder mount of Fig. 1.

Referring now to Figs. 1 and 2 of the drawings, the shoulder mount is shown generally at 1, and with a cine camera 2 and long focus lens 3 mounted thereon. There is also a showing of a prism monocular view finder 40, which is carried by the mount 1. It is to be understood that while the camera shown is generally of box-shaped configuration the invention is equally well adapted to cameras of other less uniform shapes, merely by modification of the camera holder and clamps.

The mount 1 comprises a cast arrangement while the showing of Fig. 2 relates to a weldment of formed or suitably shaped bars, plates and angle sections. In either case the structure is provided with a camera support 4, a lateral retaining portion 5, a pivotally mounted positioning stop 6 and clamp screw 7 for engagement with the threaded tripod mounting arrangements on the camera. The camera retaining structure additionally includes an upright yoke or frame 8 comprising the upright members 9 and 11 and which carries a pair of thumb screws 12 on the upper cross member 13 thereof. The thumb screws 12 carry pads at 14 for engagement with the top portion of the camera. The stop 6 is provided with a screw at 10 for clamping the rear of the camera in place on the mount.

The long focus lens 3 is attached to the front of the camera and supported in a saddle block and yoke clamp arrangement 15 at the forward end thereof. The upper semi-circular clamp member 16 is attached to the support arm 17 which is carried by the upper cross member 13 of the camera frame. The saddle or supporting block portion 18 of the lens clamp 15 is attached to a forwardly projecting rail portion 19 of the mount 1.

The support for the camera is a contoured bar 20 of Fig. 2 of a shape to conform to the configuration of the shoulder and chest of the cameraman and is provided with suitable padding at 21 such for example as fabric covered foam rubber or the like.

The forward rail portion at 22 of the mount is shaped to provide angular bracing for the lens support and is provided with a pair of pistol grip mounts 23 and 24 for steadying the front of the mount and to assist in elevating the camera and lens assembly. The right hand grip 23 is provided with a trigger 25 connected to linkage 26 for operation of the shutter release on the camera. The trigger in spring returned by a spring at 27 which is restrained by a collar 29 and biased against an upright stop portion 28 of the rail. Alternately the spring may be incorporated in the grip 23.

The rail structure 19 may also be provided with a sliding thumb screw retaining member to provide for engagement of the knurled screw 31 into the threaded tripod arrangements of lenses provided with the same.

The left hand pistol grip 24 is arranged with a slotted bar 32 for slidable mounting from the auxiliary rail support member 33, to provide for adjustment of the forward position thereof to suit the arm reach of the particular operator. It is clamped in position by the knob screw 34.

The forward portion of the lens mount structure additionally includes a supporting arrangement 35 for the prism monocular sight or view finder 40. The mounting arrangement hereinafter described in greater detail provides for forward rotation of the finder about the clamped pivot 36. This permits movement in elevation to permit parallax adjustments for variations in line of sight between the finder and lens and to compensate for variations in lens to subject distance. It is also pivotally mounted at 37 for transverse rotation about an axis parallel to the line of sight to provide rotation for orientation of the field framing lines provided therein without the necessity of manipulation of the same within the sight.

Referring now to Figs. 3 to 6 of the drawings for a showing of the clamping arrangement adjustments for the monocular view finder 40, there is shown a cylindrical column support assembly 35 which is attached to the lower lens mount rail 19 and diagonal element 22 by a bracket element 53. This includes the tube clamp member 39 which serves to receive the shaft portion 38 of a pivot clevis or yoke 50 for the joint at 36.

Figure 3:
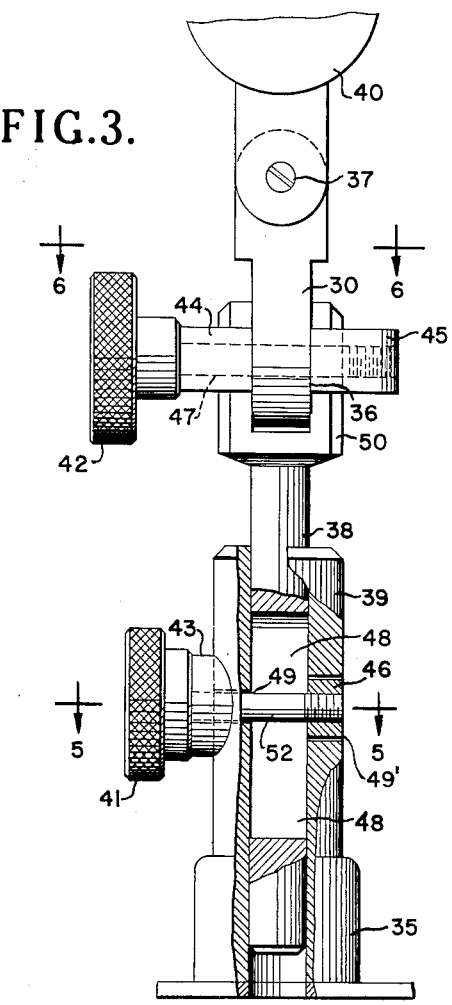
Fig. 3 is a fragmentary view in elevation of the mounting for the monocular view finder.
Figure 4:
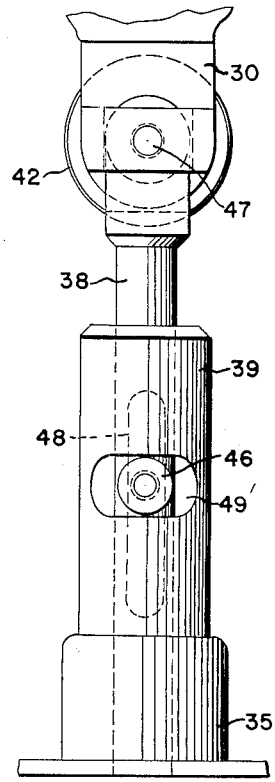
Fig. 4 is another view in elevation of the finder mounting of Fig. 3.
Figure 5:
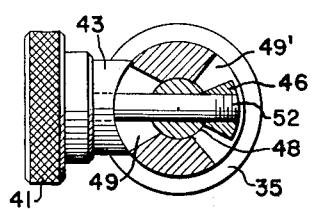
Fig. 5 is a sectional view taken along 5—5 of Fig. 3.

The clamp arrangement at nut 46 in the tube 39 as shown in greater detail in Fig. 5 comprises a knurled thumb knob 41 having a threaded rod 52 affixed thereto for engagement with a laterally movable shaped nut 46. The column member 39 is slotted horizontally to provide limited rotation of rod 38 from a normal position shown in Fig. 5 for transverse rotation of the monocular sight or view finder 40 within the limits of the slots 49 and 49' of Figs. 3 and 5. The vertical shaft or rod 38 is adapted for limited height adjustment as is apparent from the slotted portion 48 as shown in Fig. 3 and indicated by the dotted lead line in Fig. 4. Disposed between the thumb screw 41 and the outer surface of the cylindrical portion of 39 is a plano-concave washer 43 to provide clamping of the inner shaft 38 with respect to the cylindrical column 39 when the threaded rod 52 is tightened in the nut 46.

Figure 6:
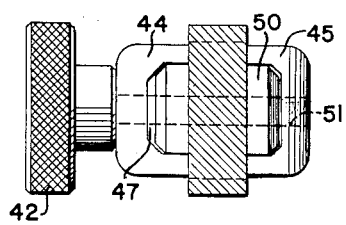
Fig. 6 is a sectional view taken along 6—6 of Fig. 3.

The intermediate pivot adjustment of the sight comprises a thumb knob 42, Figs. 3 and 6, having a rod portion 47 thereon which is threaded into clamp 45 which is one of a pair of matched clamp members providing the locked joint of the elevational pivot 36. This clamp member with the similar element 44 functions to bridge the yoke portion 50 and engage the opposite flat face surfaces of the arc member 30. These bridges are shaped in a manner to prevent rotation thereof about the yoke member and function to clamp or lock the arc portion 30 of the sight mount in a fixed position in elevation. This adjustment provides for vertical parallax compensation when the object to be photographed is relatively close to the camera. It additionally provides an arrangement for correcting sighting errors which occur with raising or lowering of the finder height with respect to the camera and mount, thereby to provide versatility of the apparatus to suit the stature and the convenience of the particular cameraman.

If desired the arc member 30 may be calibrated for changing object to lens distances as required.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. The combination with a camera and lens of a camera and lens support comprising means for securing the camera and lens to the support, means configured to rest on the shoulders and contact the chest of a camera operator for operational support of the camera with the gravitational axis from the center of gravity of the camera falling within the curvature of the shoulder configured portion of the mount, means including a pair of hand grips for directing the camera, monocular view finder means carried by said support and disposed remote from the camera at a position substantially before one eye of a camera operator, means disposed between said view finder and said support for providing positional adjustments for the sighting of the camera with said view finder, and means on the support and associated with one of said hand grips for remote operation of the camera.

2. A camera and lens supporting assembly comprising a base member having portions configured to correspond substantially to the curvature of the top of one shoulder and upper chest contour of a camera operator, retaining means for securing a camera and lens to said base with the camera disposed directly over the shoulder engaging portion, said base member having a portion extending forwardly from the chest engaging portion thereof, said last named portion carrying a positionally variable optical view finder at a position substantially corresponding to a position at one eye of an operator, and hand grip means for directing the camera from said extending portion.

3. A camera and lens supporting assembly comprising a base member having portions thereon configured respectively to correspond substantially to the contour of the upper shoulder and chest of a camera operator, retaining means for securing the camera to the upper shoulder configured portion of the base thereby to dispose the gravitational axis of the center of gravity of the camera assembly within the curvature of the shoulder portion thereof, clamp means for securing the lens to said base, a view finder mount on said base, an optical view finder on said mount, said view finder mount comprising means for positioning the view finder before one eye of a camera operator and means for adjustment thereof to obtain coincidence of the view finder field of view with the field of sight of the camera lens.

4. A camera and lens supporting assembly of claim 3 further including handle grip means on the base member for directing the camera, said handle grip means being provided with trigger means for remote operation of the camera.

5. A device for supporting a camera and lens assembly and auxiliary view finder from the shoulders of a camera operator in operative position and with the view finder before one eye, comprising a base member generally configured to conform to the upper shoulder and chest contour of a camera operator, camera retaining means disposed on said base for positioning the camera substantially on top of one shoulder of an operator, lens retaining means on a portion of the base extending forwardly from the camera retaining means, a pair of handles disposed on the forwardly extending portion of the base and adjacent the lens retaining means, one of said pair of handles being provided with means for remote operation of the camera, means for adjusting the position of the other of said handles to accommodate the reach of operators of differing stature, an optical view finder, and means mounting said view finder remote from the camera at a position corresponding to one eye of an operator, said view finder mounting means including means adjustable at will to provide coincidence between the field of view of the camera and view finder for operators of differing stature and for different lens to subject distances.

6. Apparatus for supporting photographic equipment such as cine film cameras and lenses therefor on top of one shoulder of an operator and in operative position through angles of a high order of elevation and depression comprising a camera and lens mount assembly, an optical view finder means, view finder mounting means attached to said mount assembly for providing coincidence between the view finder field of view and camera lens field, said finder mounting means being disposed to maintain the view finder in operative position before one eye of an operator, means on said mount assembly for supporting the camera above the shoulder of the operator, and the lens and view finder substantially from the shoulders, said camera supporting means having a member configured to conform substantially to the entire upper shoulder and chest profile contour of an operator in the plane of curvature thereof.

7. A camera and long focus lens mount of a character providing for support of the camera and lens from one shoulder of a camera operator with bracing from the chest and with the camera located directly over the top of the shoulder, optical view finder means on said mount disposed forward of the camera, view finder mounting means on said mount, means for providing height adjustment of the view finder selective to the stature of the operator, means adjustable at will for azimuth parallax correction for the view finder correlative with said height adjustment, and means adjustable at will for providing elevational parallax correction of said view finder, said mount being configured to conform generally to the contour of the entire top of one shoulder in the plane of curvature thereof and substantially to the upper chest curvature of a camera operator.

8. The structure of claim 7 further comprising a pair of hand grips on a forward portion of the mount for manual support and directing movement of the camera and lens through varied angles of elevation, one of said grips having means thereon for remote operation of the camera and the other grip being provided with a mounting movable to accommodate the arm reach of the operator.

9. A camera and long focus lens mount of a character providing for support of the camera and lens from one shoulder of a camera operator with bracing from the chest and with the camera located directly over the top of the shoulder of the operator, an optical view finder, means for mounting said view finder on said mount and disposed forward of the camera, means for providing height adjustment of the view finder selective at will to the stature of the operator, means adjustable at will for azimuth parallax correction for the view finder correlative with said height adjustment, means adjustable at will for providing elevational parallax correction of said view finder correlative to the field view of the camera lens, said mount being configured to conform generally to the contour of the entire top of one shoulder of the operator in the plane of curvature thereof and extending therefrom in a manner to conform substantially to the upper chest curvature of said operator, a pair of hand grips on a forward portion of the mount for manual support of said forward portion of the mount and for directing movement of the camera and lens through different angles of elevation, one of said grips having means thereon for remote operation of the camera and the other grip having a mounting movable at will to accommodate different lengths of reach of camera operators, a locking clamp for the said height adjustment means comprising a generally vertically disposed cylindrical column member to which the view finder is attached through said elevation parallax correction means, a cylindrical member on said mount for telescopic reception of said column member, a pair of arcuate peripherally slotted portions in each of said cylindrical members, a clamp screw movable in one of said portions, a clamp nut engaged by said screw and configured for movement in the other of said slotted portions, and means cooperative with the cylindrical member for restraining said nut against said column member to lock the column member against longitudinal and transverse movement.

References Cited in the file of this patent
UNITED STATES PATENTS

| | | |
|---|---|---|
| 2,370,611 | Du Mais | Feb. 27, 1945 |
| 2,483,711 | Roos | Oct. 4, 1949 |
| 2,552,205 | Moss | May 8, 1951 |
| 2,603,134 | Burnam | July 15, 1952 |